(12) United States Patent
Currans et al.

(10) Patent No.: US 6,977,749 B2
(45) Date of Patent: Dec. 20, 2005

(54) SYSTEM AND METHOD FOR PRINTING IMAGES ON LABELS AND FORMS IN A PRINTING DEVICE

(75) Inventors: Kevin G. Currans, Philomath, OR (US); Jason T. Su, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 922 days.

(21) Appl. No.: 09/798,531

(22) Filed: Mar. 2, 2001

(65) Prior Publication Data

US 2002/0122206 A1   Sep. 5, 2002

(51) Int. Cl.⁷ .......................... G06F 15/00; B42D 15/00; G06K 7/00
(52) U.S. Cl. ...................... 358/1.18; 358/449; 358/474; 235/435; 283/81
(58) Field of Search .............................. 358/1.18, 472, 358/424, 449; 235/435; 101/288; 400/76, 400/61; 283/81

(56) References Cited

U.S. PATENT DOCUMENTS

| 4,717,059 A | | 1/1988 | Takahashi |
| 5,100,248 A | | 3/1992 | Cripe |
| 5,532,825 A | | 7/1996 | Lim et al. |
| 5,782,496 A | | 7/1998 | Casper et al. |
| 5,974,202 A | * | 10/1999 | Wang et al. ............... 382/306 |
| 6,111,655 A | * | 8/2000 | Kashihara et al. .......... 358/1.18 |
| 6,147,767 A | | 11/2000 | Petteruti et al. |
| 6,276,771 B1 | * | 8/2001 | Kim et al. ...................... 347/3 |
| 6,373,591 B1 | * | 4/2002 | Seaman et al. ............ 358/1.18 |
| 6,456,385 B1 | * | 9/2002 | Rolling et al. ............. 358/1.11 |
| 6,519,047 B1 | * | 2/2003 | Ahn ........................... 358/1.12 |
| 6,674,542 B1 | * | 1/2004 | Shimamura ................ 358/1.18 |
| 6,741,270 B1 | * | 5/2004 | Rzepkowski et al. ........ 715/810 |

FOREIGN PATENT DOCUMENTS

| GB | 2227718 | 8/1990 |
| GB | 2249997 | 5/1992 |

OTHER PUBLICATIONS

Hewlett-Packard Company U.S. Appl. No. 09/545,990; filed Apr. 10, 2000; "A System And Related Methods For Automatically Determining Media Type In A Printing Device Media Tray."
Hewlett-Packard Company U.S. Appl. No. 09/641,617; filed Aug. 17, 2000; "Document Delivery System With Automatically Adjusted Copy Inserts."
British Search Report dated Aug. 14, 2002.

* cited by examiner

*Primary Examiner*—Edward Coles
*Assistant Examiner*—Chan S. Park

(57) ABSTRACT

An apparatus and method are disclosed herein for printing images on labels attached to a backing in a printing device. An apparatus and method for printing an image in a predetermined area of a form are also disclosed. Further characteristics and features of the present invention are additionally disclosed herein, as are exemplary alternative embodiments. This abstract is not to be used in the interpretation of any of the claims.

13 Claims, 8 Drawing Sheets

| Label Sheet Type | Label Locations | Label Size(s) |
|---|---|---|
| | | |
| | | |
| | | |
| | | |
| | | |
| | | |
| | | |
| | | |

FIG. 4

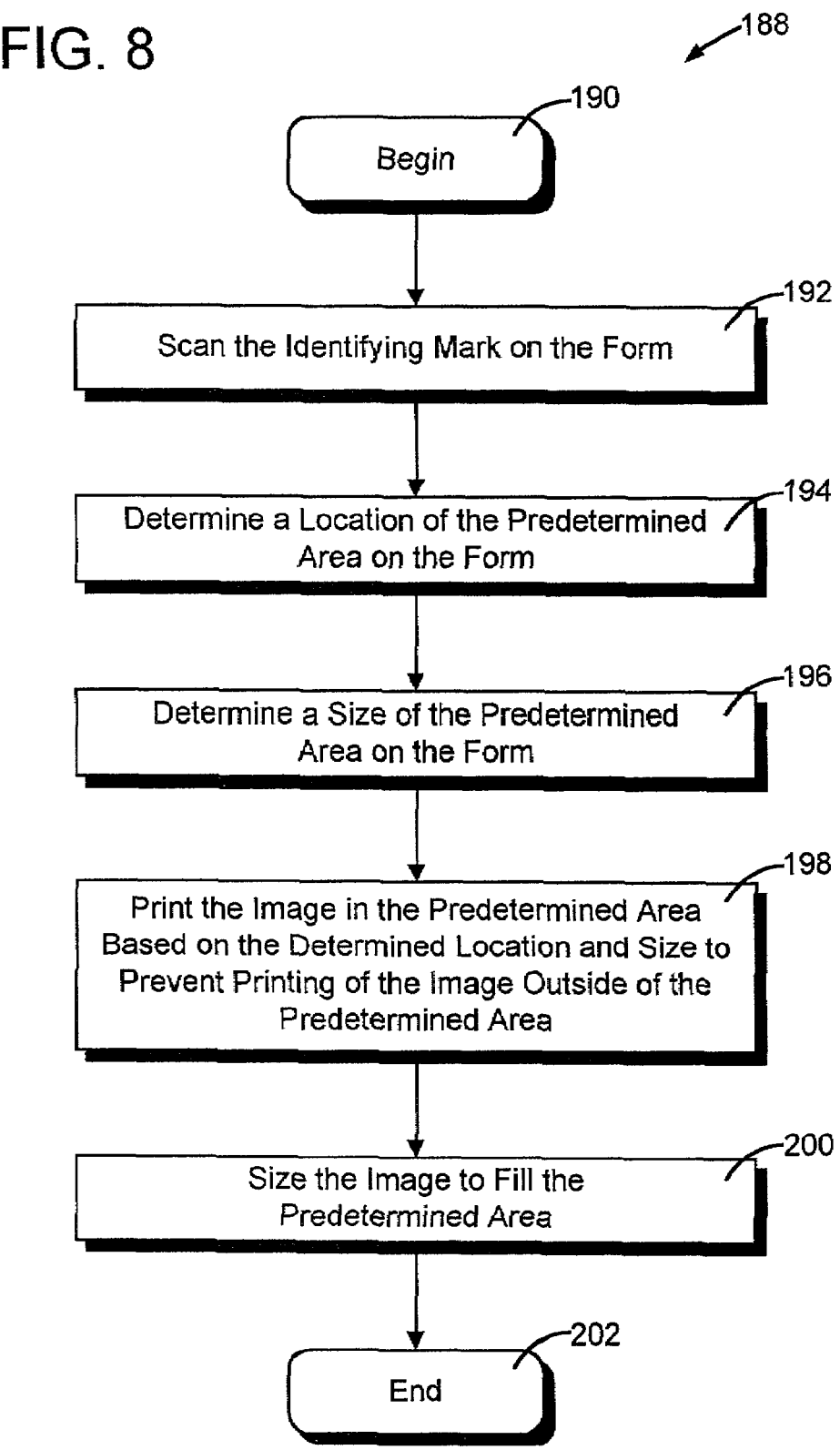

SYSTEM AND METHOD FOR PRINTING IMAGES ON LABELS AND FORMS IN A PRINTING DEVICE

BACKGROUND

The present invention relates to printing devices. More particularly, the present invention relates to a system and method for printing images on labels attached to a backing in a printing device and to printing an image in a predetermined area of a form.

Printing devices, such as inkjet printers and laser printers, use printing composition (e.g., ink or toner) to print images (text, graphics, etc.) onto a print medium in a printzone of the printing device. Inkjet printers may use print cartridges, also known as "pens", which shoot drops of printing composition, referred to generally herein as "ink", onto a print medium such as paper, labels, forms, or transparencies. Each pen has a printhead that includes a plurality of nozzles. Each nozzle has an orifice through which the drops are ejected. To print an image, the printhead is propelled back and forth across the page by, for example, a carriage while ejecting drops of ink in a desired pattern as the printhead moves. The particular ink ejection mechanism within the printhead may take on a variety of different forms known to those skilled in the art, such as thermal printhead technology. For thermal printheads, the ink may be a liquid, with dissolved colorants or pigments dispersed in a solvent.

Labels used in printing devices are typically affixed to a backing and arranged in a predetermined layout. A user removes those labels that have been printed from the backing and can subsequently print on any remaining labels. When a user desires to print labels on a backing in a printing device, he or she must first determine which labels are available for printing. Currently known software programs for label printing, such as Avery Label Pro and 3M Post-It software, require that the user identify such things as the brand of labels, the layout of the labels on the backing, and which labels within that layout are available on a backing for printing. From this information, the software is then able to determine the size and location of the available labels on the backing before printing begins.

For a user, determining and entering this information can be a time consuming task. Also, if the user incorrectly determines or incorrectly enters a parameter, then an error will likely occur during printing of an image on a label, such as printing of part of the image on the backing instead of the label. Such errors not only waste labels but also user time.

Forms used in printing devices typically include one or more predetermined areas for printing of images. For example, some award certificates include blank areas for things such as the award title, the name of the person, and the date. When a person desires to print on such a form, he or she must use software that recognizes the form. Such software typically requires that the user identify the form type so that the one or more predetermined areas on the form for printing can be located. Determining and entering this information can be a time consuming task for the user. Also, if the user incorrectly determines or incorrectly enters the form type information, an error will likely occur during printing of the form, such as printing of part of the image outside of the predetermined area. Such errors not only waste forms but also user time.

SUMMARY

A system and method that solved these above-described problems associated with printing labels and forms in a printing device would be a welcome improvement. Accordingly, the present invention is directed to a system and method for printing images on labels attached to a backing in a printing device and to printing an image in a predetermined area of a form.

An embodiment of a method in accordance with the present invention of printing labels in a printing device, each label being attached to a backing and the printing device having an optical sensor, includes determining a size of each label on the backing. The method additionally includes determining a location of each label on the backing and scanning with the optical sensor to determine which labels are available for printing. The method further includes printing an image on at least one available label based on the determined size of the label to prevent printing of the image on the backing.

The above-described embodiment of a method in accordance with the present invention may be modified and include at least the following characteristics, as described below. The size of each label on the backing may be determined by scanning a characteristic of the backing. The location of each label on the backing may be determined by scanning a characteristic of the backing. The backing may be an envelope.

The method may also include marking the backing after printing to indicate which labels remain available for subsequent printing. In such cases, the method may further include scanning the marking on the backing to determine which labels remain available for subsequent printing.

An embodiment of a system in accordance with the present invention for printing on labels attached to a backing includes a printing device for printing images and an optical sensor in the printing device. The optical sensor is configured both to read a characteristic of the backing and to scan the labels and backing. The system also includes a computing device coupled to the printing device to control printing of images by the printing device and to the optical sensor to receive signals therefrom. The computing device is configured to determine a size of the labels on the backing and a location of the labels on the backing based on signals received from the optical sensor during reading of the characteristic of the backing. The computing device is additionally configured to determine which labels are available for printing based on signals received from the optical sensor during scanning of the labels and backing.

The above-described embodiment of a system in accordance with the present invention may be modified and include at least the following characteristics, as described below. The computing device may be further configured to control printing of images by the printing device on available labels based on the determined sizes and locations of the labels to prevent printing of images on the backing.

The computing device may be further configured to control the printing device to mark the backing with encoded data indicating which labels remain available for subsequent printing. In such cases, the optical sensor may also configured to scan the mark on the backing.

An alternative embodiment of a system in accordance with the present invention includes structure for determining a size of the labels on the backing and structure for determining a location of the labels on the backing. The system also includes scanning structure for determining which labels are available for printing and structure for printing an image on at least one available label based on the determined size of the label to prevent printing of the image on the backing.

An embodiment of a method in accordance with the present invention of printing an image on a form in a printing device, the printing device having an optical sensor and the form including an identifying mark having encoded data and a predetermined area for printing, includes scanning the identifying mark on the form with the optical sensor. The method also includes determining a location of the predetermined area on the form based on information obtained from the encoded data scanned by the optical sensor and determining a size of the predetermined area on the form based on information obtained from the encoded data scanned by the optical sensor. The method further includes printing the image in the predetermined area based on the determined location and size to prevent printing of the image outside of the predetermined area.

The above-described embodiment of a method in accordance with the present invention may be modified and include at least the following characteristics, as described below. The method may further include sizing the image to fill the predetermined area.

An embodiment of a system in accordance with the present invention for printing an image on a form having a predetermined area for printing and an identifying mark including encoded data, includes a printing device for printing images and an optical sensor in the printing device. The optical sensor is configured to scan the identifying mark. The system further includes a computing device coupled to the printing device to control printing of images by the printing device and to the optical sensor to receive signals therefrom. The computing device is configured to determine a location of the predetermined area on the form based on signals received from the optical sensor during scanning of the identifying mark. The computing device is also configured to determine a size of the predetermined area on the form based on signals received from the optical sensor during scanning of the identifying mark.

The above-described embodiment of a system in accordance with the present invention may be modified and include at least the following characteristics, as described below. The computing device may further be configured to control printing of the image by the printing device in the predetermined area based on the determined location and size to prevent printing of the image outside of the predetermined area. The computing device may be further configured to size the image so that the image fills the predetermined area.

An alternative embodiment of a system in accordance with the present invention for printing an image on a form having a predetermined area for printing and an identifying mark, includes structure for scanning the identifying mark on the form. The system also includes structure for determining a location of the predetermined area on the form and structure for determining a size of the predetermined area on the form. The system further includes structure for printing the image in the predetermined area based on the determined location and size to prevent printing of the image outside of the predetermined area.

The above-described alternative embodiment of a system in accordance with the present invention may be modified and include at least the following characteristics, as described below. The system may further include structure for sizing the image to fill the predetermined area.

The foregoing summary is not intended by the inventors to be an inclusive list of all the aspects, advantages, and features of the present invention, nor should any limitation on the scope of the invention be implied therefrom. This summary is provided in accordance with 37 C.F.R. Section 1.73 and M.P.E.P. Section 608.01(d). Additionally, it should be noted that the use of the word substantially in this document is used to account for things such as engineering and manufacturing tolerances, as well as variations not affecting performance of the present invention. Other objects, advantages, and novel features of the present invention will become apparent from the following detailed description when considered in conjunction with the accompanying drawings.

BRIEF DESCRIPTION OF THE DRAWINGS

FIG. 4 is a diagram of a look-up table for use in accordance with the present invention.

FIG. 8 is a diagram of an embodiment of a method of printing forms in a printing device in accordance with the present invention.

DETAILED DESCRIPTION OF THE DRAWINGS

Figure 1:
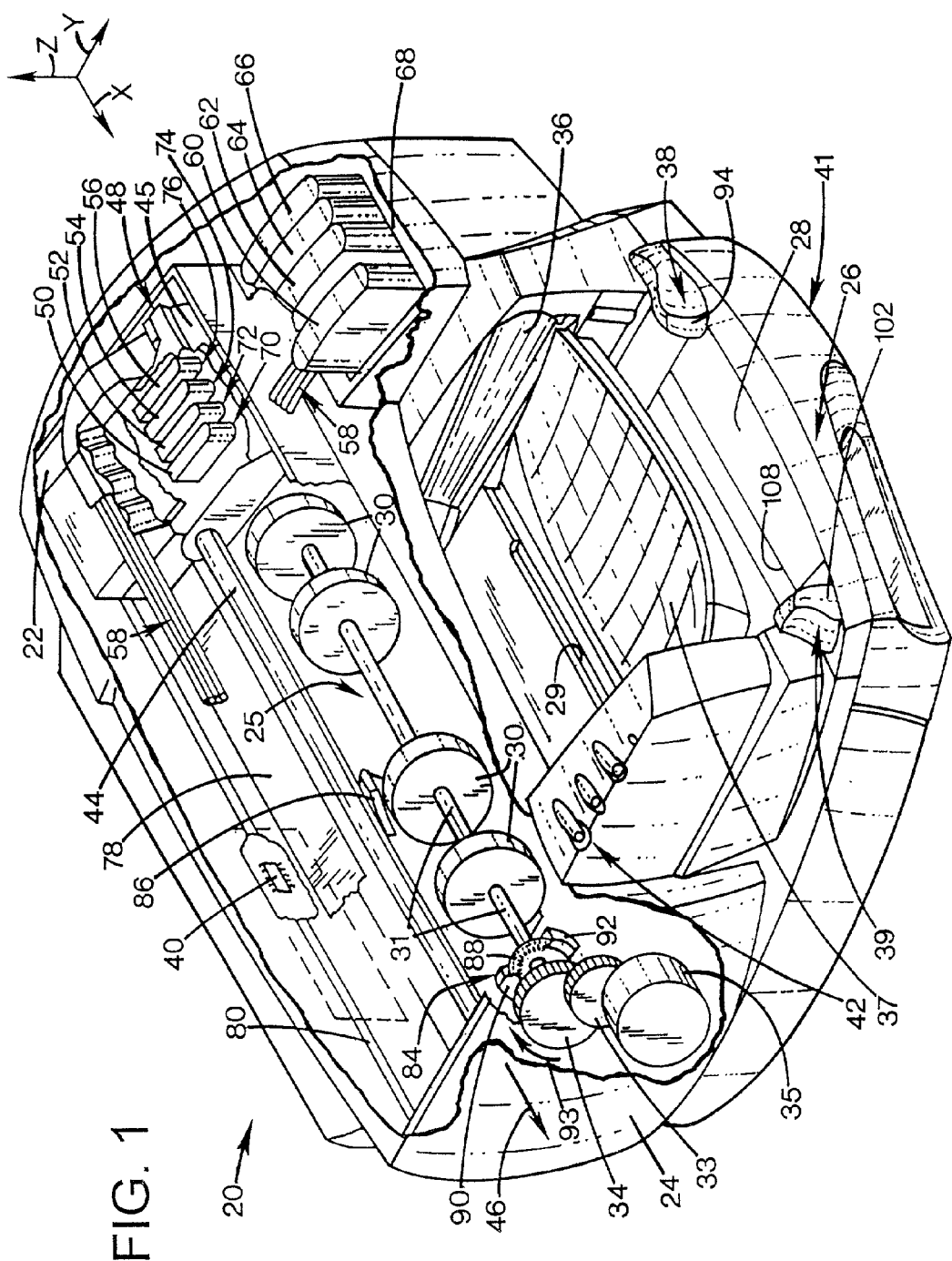
FIG. 1 is a diagrammatic view of a printing device that includes an embodiment of the present invention.

FIG. 1 illustrates an embodiment of an inkjet printing device 20, here shown as an inkjet printer, that includes an embodiment of the present invention and which may be used for printing business reports, correspondence, labels, forms, desktop publishing, and the like, in an industrial, office, home or other environment. A variety of inkjet printing devices are commercially available. For instance, some of the printing devices that may embody the present invention include plotters, portable printing units, and copiers to name a few. For convenience, the concepts of the present invention are illustrated in the environment of inkjet printer 20.

While printing device components may vary from model to model, a typical inkjet printer 20 includes a frame or chassis 22 surrounded by a housing, casing or enclosure 24, typically made of a plastic material. Sheets of print media are fed through a printzone 25 by a print media handling system 26. The print media may be any type of suitable material, such as plain paper, labels, forms, card-stock, transparencies, photographic paper, fabric, metalized media, etc. Print media handling system 26 includes a print media input tray 28 for storing sheets of print media for printing. A series of conventional print media drive rollers 30 rotate about on shaft 31 which is driven by a motor 35 through a series of drive gears 33 and 34. Gears 33 and 34 are rotateably coupled to shaft 31 to rotate shaft 31 in a direction generally indicated by arrow 93. Drive rollers 30 are used to move print media from input tray 28, through printzone 25 and, after printing, onto a pair of extendable output drying wing members 36, shown in a retracted or rest position in FIG. 1. Wings 36 momentarily hold a newly printed sheet of print media above any previously printed sheets still drying in an output tray 37. Print media handling system 26 also includes means for accommodating different sizes of print media, including letter, legal, A-4, B, envelopes, etc. This means includes a print medium length adjuster 38 and a print medium width adjuster 39. Print medium length adjuster 38 and print medium width adjuster 39 are manually repositionable against the sides of different sizes of print medium, and thereby accommodate for these different sizes. An envelope feed port 29 may be used in lieu of repositioning print medium length adjuster 38 and print medium width adjuster 39 to accommodate for the smaller size of such envelopes.

As shown in FIG. 1, print media handling system 26 also includes an additional print media input tray 41, for storing sheets of print media for printing. Drive rollers 30 are also used to move print media from input tray 41, through printzone 25 and, after printing, onto extendable output drying wing members 36, as discussed above. Although not shown in FIG. 1, it is to be understood that print media input tray 41 may also include means for accommodating different sizes of print media, including letter, legal, A-4, B, envelopes, etc., such as print medium length adjuster 38 and a print medium width adjuster 39.

The present invention may be used with printing devices that include any number of additional print media input trays for sheets of print media and/or print media racks for rolls of print media. Additionally, the present invention may be used with printing devices that include only one print media input tray for sheets of print media or only one print media rack for rolls of print media. Further, print media handling system 26 and printing device 20 may be configured to support specific print tasks such as duplex printing (i.e., printing on both sides of the sheet of print media) and banner printing.

Printing device 20 also includes a computing device 40, illustrated as a microprocessor or controller, that receives instructions from a host device, typically a computer, such as a personal computer (not shown). Many of the functions of computing device 40 may be performed by a host computer, including any printing device drivers resident on the host computer, by electronics in the printing device, or by interactions between the host computer and the electronics. As used herein, the term "computing device 40" encompass these functions, whether performed by a host computer, printing device 20, an intermediary device between the host computer and printing device 20, or by combined interaction of such elements. Computing device 40 may also operate in response to user inputs provided through a keypad 42 located on the exterior of casing 24. A monitor (not shown) coupled to the computer host may be used to display visual information to a user of printing device 20, such as the printer status or a particular program being run on the host computer. Personal computers, input devices, such as a keyboard and/or a mouse device, and monitors are all known to those skilled the art.

A carriage guide rod 44 is supported by chassis 22 to slideably support an off-axis inkjet carriage 45 for travel back and forth across printzone 25 along a scanning axis generally designated by arrow 46 in FIG. 1. As can be seen in FIG. 1, scanning axis 46 is substantially parallel to the X-axis of the XYZ coordinate system shown in FIG. 1. Carriage 45 is also propelled along guide rod 44 into a servicing region, generally indicated by arrow 48, located within the interior of housing 24 of printing device 20. A conventional carriage drive gear and motor assembly (both of which are not shown in FIG. 1) may be coupled to drive an endless loop, which may be secured in a conventional manner to carriage 45, with the motor operating in response to control signals received from computing device 40 to incrementally advanced carriage 45 along guide rod 44 in response to movement of the motor.

In printzone 25, a sheet of print media receives ink from an inkjet cartridge, such as black ink cartridge 50 and three monochrome color ink cartridges 52, 54, and 56. Cartridges 50, 52, 54, and 56 are also called "pens" by those skill the art. Pens 50, 52, 54, and 56 each include small reservoirs for storing a supply of printing composition, referred to generally herein as "ink" in what is known as an "off-axis" ink delivery system, which is in contrast to a replaceable ink cartridge system where each pen has a reservoir that carries the entire ink supply as the printhead reciprocates over printzone 25 along carriage scan axis 46. The replaceable ink cartridge system may be considered an "on-axis" system, whereas systems which store the main ink supply at a stationary location remote from the printzone scanning axis are called "off-axis" systems. It should be noted that the present invention is operable in both off-axis and on-axis systems, as well as non-inkjet systems such as dot matrix and laser jet systems.

In the illustrated off-axis printing device 20, ink of each color from each printhead is delivered via a conduit or tubing system 58 from a group of main ink reservoirs 60, 62, 64, and 66 to the on-board reservoirs of respective pens 50, 52, 54, and 56. Ink reservoirs 60, 62, 64, and 66 are replaceable ink supplies stored in a receptacle 68 supported by printer chassis 22. Each of pens 50, 52, 54, and 56 has a respective printhead, as generally indicated by arrows 70, 72, 74, and 76, which selectively ejects ink to form an image on a print medium in printzone 25.

Printheads 70, 72, 74, and 76 each have an orifice plate with a plurality of nozzles formed therethrough in a manner well-known to those skill the art. The illustrated printheads 70, 72, 74, and 76 are thermal inkjet printheads, although other types of printheads may be used, such as piezoelectric printheads. Thermal printheads 70, 72, 74, and 76 typically include a plurality of resistors which are associated with the nozzles. Upon energizing a selected resistor, a bubble of gas is formed which ejects a droplet of ink from the nozzle onto the print medium in printzone 25 under the nozzle. The printhead resistors are selectively energized in response to firing command control signals delivered by a multi-conductor strip 78 (a portion of which is shown in FIG. 1) from computing device 40 to printhead carriage 45.

An optical quadrature encoder strip 80 extends along the length of printzone 25 and over the area of service station region 48 to provide carriage 45 positional feedback information to computing device 40, with a carriage position quadrature encoder reader 81 (see FIG. 2) being mounted on a back surface of printhead carriage 45 to read positional information provided by optical quadrature encoder strip 80. Printing device 20 uses optical quadrature encoder strip 80 and the carriage position quadrature encoder reader to trigger the firing of printheads 70, 72, 74, and 76 and to provide feedback for position and velocity of carriage 45.

A print medium axis position quadrature encoder 84 is also shown in FIG. 1. Print medium axis position quadrature encoder 84 provides positional feedback information to computing device 40 regarding the position of print media drive rollers 30. Printing device 20 uses print medium axis position quadrature encoder 84 in combination with flag 86 to help accurately position print medium in printzone 25 and to control printing by one or more of printheads 70, 72, 74, and 76. Flag 86 detects the presence of print medium in printzone 25. Print medium axis position quadrature encoder 84 includes a rotary encoder 88 and a pair of rotary encoder readers 90 and 92. Rotary encoder 88 is coupled to shaft 31 to rotate therewith in the direction generally indicated by arrow 93.

Rotary encoder 88 may be made from things such as photo imaged MYLAR brand film, and works with a light source and a light detector (both of which are not shown) of each of rotary encoder readers 90 and 92. These light sources direct light through rotary encoder 88 which is received by the light detectors and converted into electrical signals which are used by computing device 40 of printing device 20 to help accurately position print medium in printzone 25 and to control firing of printheads 70, 72, 74, and 76. Markings or indicia on rotary encoder 88 periodically block this light from the light detectors of rotary encoder readers 90 and 92 in a predetermined manner which results in a corresponding change in the electrical signal from the detectors of rotary encoder readers 90 and 92 which is processed by computing device 40.

Figure 2:
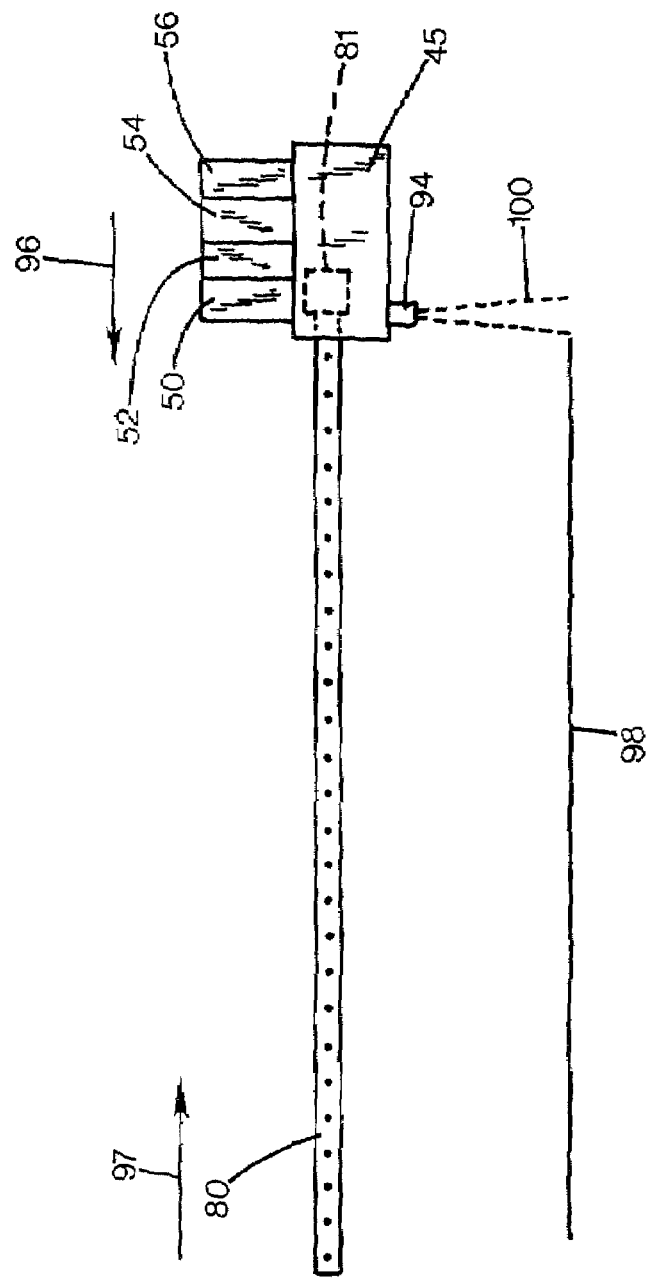
FIG. 2 is a side view of an optical sensor configured to scan labels and forms in accordance with the present invention.

A side view of an optical sensor 94 configured to scan labels and forms in accordance with the present invention is shown in FIG. 2. As can be seen in FIG. 2, carriage 45 moves in a direction generally indicated by arrow 96 and then in a direction generally indicated by arrow 97 to allow optical sensor 94 to scan back and forth across print medium 98 which can be a sheet of labels, an envelope with labels or a form, as more fully discussed below. During such scanning, optical sensor 94 emits a light signal 100 toward print medium 98 which is reflected from print medium 98 and received by optical sensor 94. Optical sensor 94 is configured to convert this reflected signal into a proportional electrical signal. Computing device 40 is coupled to optical sensor 94 to receive these electrical signals as more fully discussed below.

As is known to those of ordinary skill in the art, characteristics of this reflected light signal change depending on the reflectivity of print medium 98 in the area in which light signal 100 is directed. Changes in reflectivity can occur for a variety of reasons such as characteristics of a particular print medium 98 (e.g., glossy-finish versus matte-finish), codes or identifying marks on print medium 98, blank labels, or blank areas intended for printing.

Figure 3:
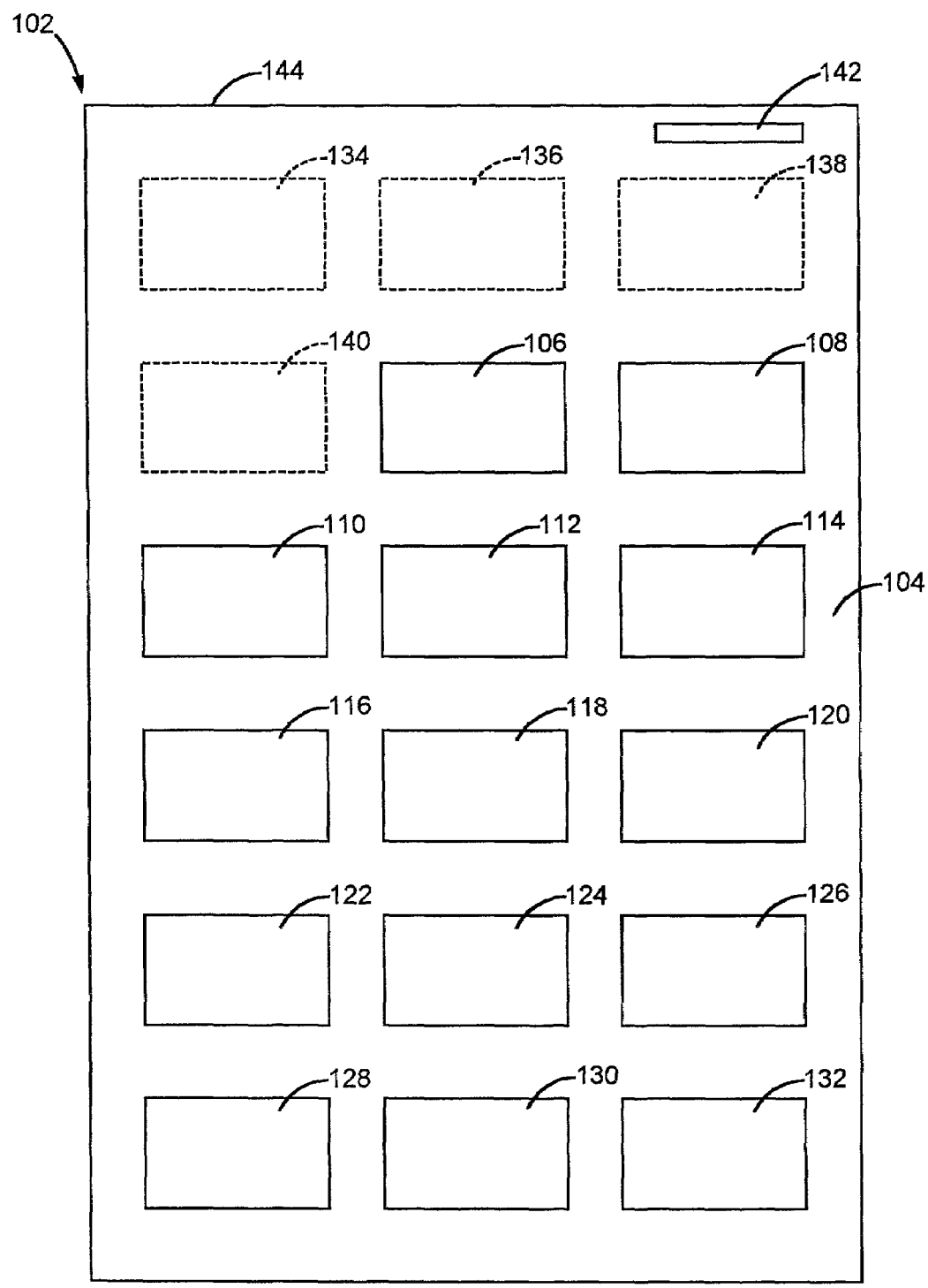
FIG. 3 is a diagrammatic view of a sheet of labels for use in the present invention.

A diagrammatic view of a sheet of labels 102 for use in the present invention is shown in FIG. 3. As can be seen in FIG. 3, sheet of labels 102 includes a backing 104 to which are affixed a plurality of unused blank labels 106, 108, 110, 112, 114, 116, 118, 120, 122, 124, 126, 128, 130 and 132. The locations of used labels 134, 136, 138 and 140 that were previously affixed to backing 104 are shown in outline in FIG. 3. A characteristic 142 of backing 104 is additionally shown in FIG. 3.

In one embodiment of the present invention, characteristic 142 includes a code or identifying mark that encodes data as to the locations and sizes of each of labels 106, 108, 110, 112, 114, 116, 118, 120, 122, 124, 126, 128, 130, 132, 134, 136, 138, and 140 on sheet of labels 102, as well as the type (e.g., clear, matte-finish, glossy-finish, etc.) of each of labels 106, 108, 110, 112, 114, 116, 118, 120, 122, 124, 126, 128, 130, 132, 134, 136, 138, and 140 on sheet of labels 102. Characteristic 142 may be visually perceptible or visually imperceptible.

In accordance with the present invention, characteristic 142 is scanned by optical sensor 94. As discussed above, during such scanning of characteristic 142, optical sensor 94 produces an electrical signal proportional to the reflected light signal from characteristic 142. As also discussed above, computing device 40 is coupled to optical sensor 94 to receive these electrical signals. Computing device 40 is configured to determine both the size and location of labels 106, 108, 110, 112, 114, 116, 118, 120, 122, 124, 126, 128, 130, 132, 134, 136, 138, and 140 on backing 104 based on these signals received from optical sensor 94.

In accordance with the present invention, computing device 40 is also configured to determine which of labels 106, 108, 110, 112, 114, 116, 118, 120, 122, 124, 126, 128, 130, 132, 134, 136, 138, and 140 on backing 104 are available for printing of images thereon by pens 50, 52, 54, and 56. Computing device 40 makes this determination based on signals received from optical sensor 94 during scanning of labels 106, 108, 110, 112, 114, 116, 118, 120, 122, 124, 126, 128, 130, 132, 134, 136, 138, and 140 and backing 104. For example, after optical sensor 94 scans characteristic 142 near top 144 of backing 104, reflected light signals remain substantially the same from backing 104 and previously used label locations 134, 136, 138, and 140 until light signals are reflected from label 106. Optical sensor 94 will convert this change in reflected light signal into a proportionally changed electrical signal that will be received by computing device 40 and recognized as the presence of blank label 106 which is available for printing. Labels 108, 110, 112, 114, 116, 118, 120, 122, 124, 126, 128, 130, and 132 which are also available for printing are likewise located.

In an alternative embodiment of the present invention, characteristic 142 does not include a code or identifying mark, but instead represents an area of backing 104 of sheet of labels 102 that is scanned by optical sensor 94, as described above which produces a signal received by computing device 40. If different backings are used for different sheets of labels, then these signals received by computing device 40 will also be different. In this alternative embodiment, computing device 40 includes a look-up table 146 like the one shown in FIG. 4 having data from various label sheet providers regarding label sheet type 148, label locations 150, and label size 152 (for sheets of labels of uniform size) or label sizes (for sheets of labels of different sizes). Computing device 40 is configured to recognize different received signals as representing different label sheet types 148. Computing device is farther configured to determine label locations 150 and label size or sizes 152 from look-up table 146 based on the particular label sheet type 148.

Once label size, location, and availability are determined, computing device 40 is configured to control printing of images only on available labels 106, 108, 110, 112, 114, 116, 118, 120, 122, 124, 126, 128, 130, and 132, rather than partially on one of available labels 106, 108, 110, 112, 114, 116, 118, 120, 122, 124, 126, 128, 130, and 132 and partially on backing 104. This helps prevent label waste and user frustration. It also saves time that would otherwise be spent on reprinting another label.

In one or more embodiments of the present invention, computing device 40 is additionally configured to mark backing 104 with encoded data (not shown) at the end of a printing job in which all available labels 106, 108, 110, 112, 114, 116, 118, 120, 122, 124, 126, 128, 130, and 132 have not been used to indicate which labels remain available for subsequent printing. This marking may be either visually perceptible or visually imperceptible. Optical sensor 94 is configured to scan this mark on the backing during initiation of a subsequent print job so that computing device 40 can quickly determine which labels remain available for printing rather than scanning backing 104 to locate an available label. This helps save time thereby increasing printing device throughput.

Figure 5:
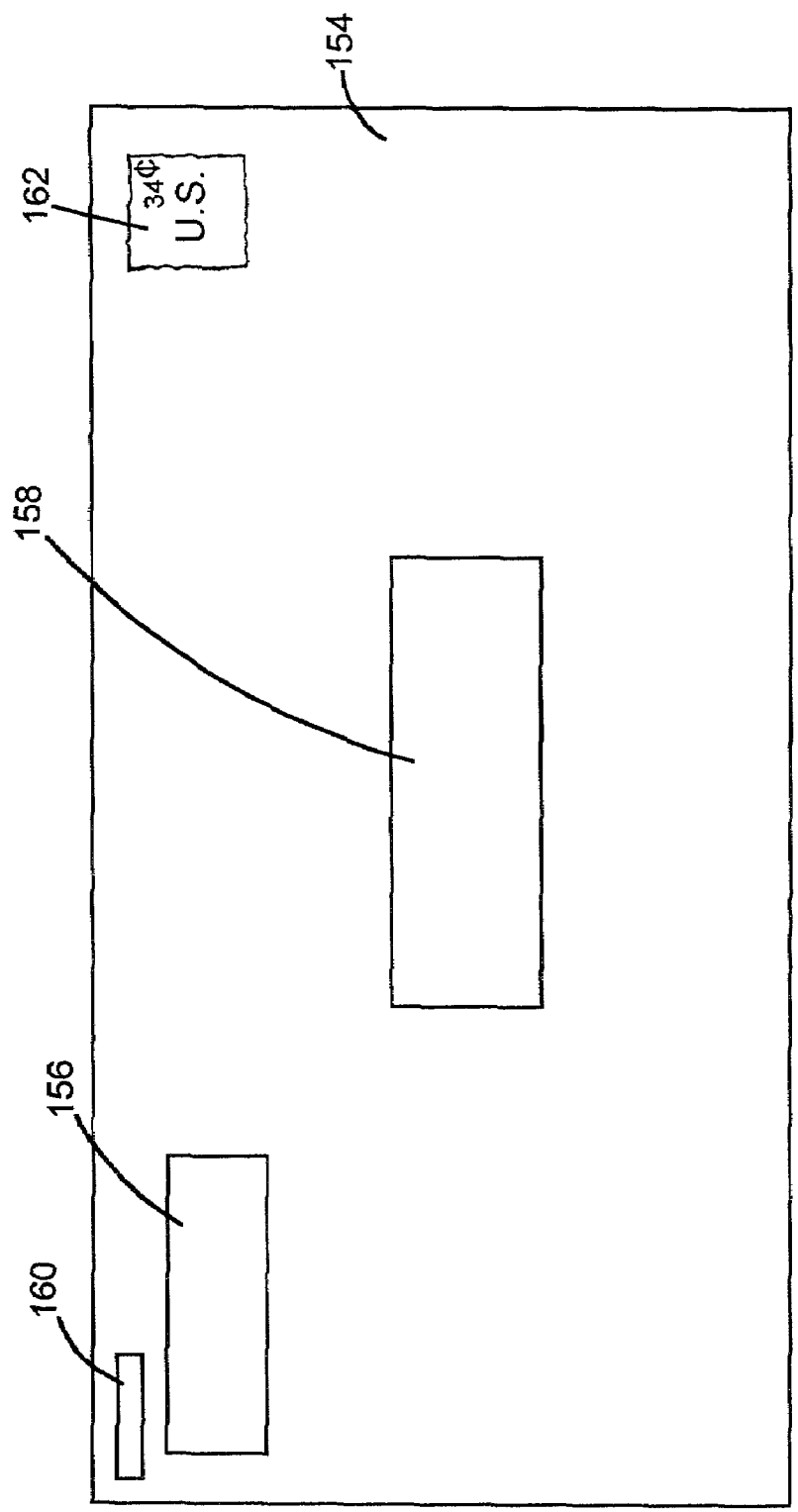
FIG. 5 is a view of an envelope with affixed labels for use in the present invention.

A view of an envelope 154 with affixed labels 156 and 158 for use in the present invention is shown in FIG. 5. As can be seen in FIG. 5, envelope 154 also includes a characteristic 160 that includes a code or identifying mark that encodes data as to the locations and sizes of each of labels 156 and 158 on envelope 154, as well as the type (e.g., clear, matte-finish, glossy-finish, etc.) of each of labels 156 and 158. Characteristic 160 is preferably imperceptible, but may be visually perceptible as well.

In accordance with the present invention, characteristic 160 is scanned by optical sensor 94. As discussed above, during such scanning of characteristic 160, optical sensor 94 produces an electrical signal proportional to the reflected light signal from characteristic 160. As also discussed above, computing device 40 is coupled to optical sensor 94 to receive these electrical signals. Computing device 40 is configured to determine both the size and location of labels 156 and 158 on envelope 154 based on these signals received from optical sensor 94.

In accordance with the present invention, computing device 40 is also configured to determine which of labels 156 and 158 on envelope 154 are available for printing of images thereon by pens 50, 52, 54, and 56. Computing device 40 makes this determination based on signals received from optical sensor 94 during scanning of labels 156 and 158. For example, after optical sensor 94 scans characteristic 160, label 156 will be scanned. If label 156 is blank a light signal with a different characteristic will be reflected than if label 156 already had an image thereon. Optical sensor 94 will convert these different reflected light signals into different electrical signals that will be received by computing device 40 and recognized as either the presence of a blank label which is available for printing or a label with an image already thereon in which case no printing will occur. The same process occurs for label 158.

Once label size, location, and availability are determined, computing device 40 is configured to control printing of images only on available labels, rather than partially on one of available labels 156 or 158, and partially on envelope 154. This helps prevent label, envelope, and stamp 162 (if already on envelop 154) waste, as well as user frustration. It also saves time that would otherwise be spent on reprinting another label or labels on a different envelope.

Figure 6:
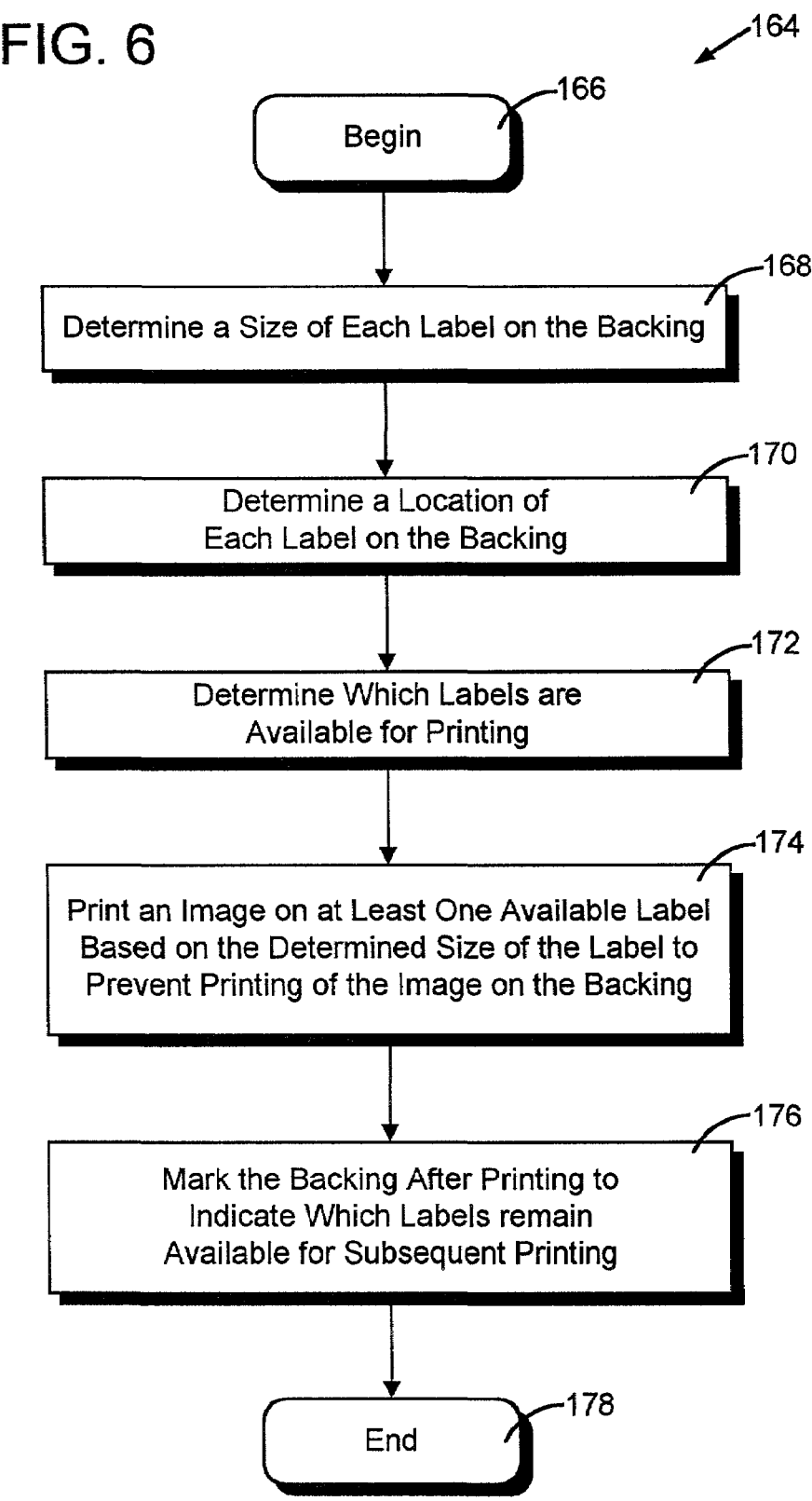
FIG. 6 is a diagram of an embodiment of a method of printing labels in a printing device in accordance with the present invention.

A diagram of an embodiment of a method 164 of printing labels in a printing device in accordance with the present invention is shown in FIG. 6. Method 164 begins 166 with a determination of a size of each label on a backing 168 and a determination of a location of each label on the backing 170. The backing referred to in method 164 may be either a label sheet backing like backing 104 or an envelope like envelope 154. Next, method 164 determines which labels are available for printing 172. Next, method 164 prints an image on at least one available label based on the determined size of the label to prevent printing of the image on the backing 174. Next, method 164 marks the backing after printing to indicate which labels remain available for subsequent printing 176. Method 164 then ends 178.

Figure 7:
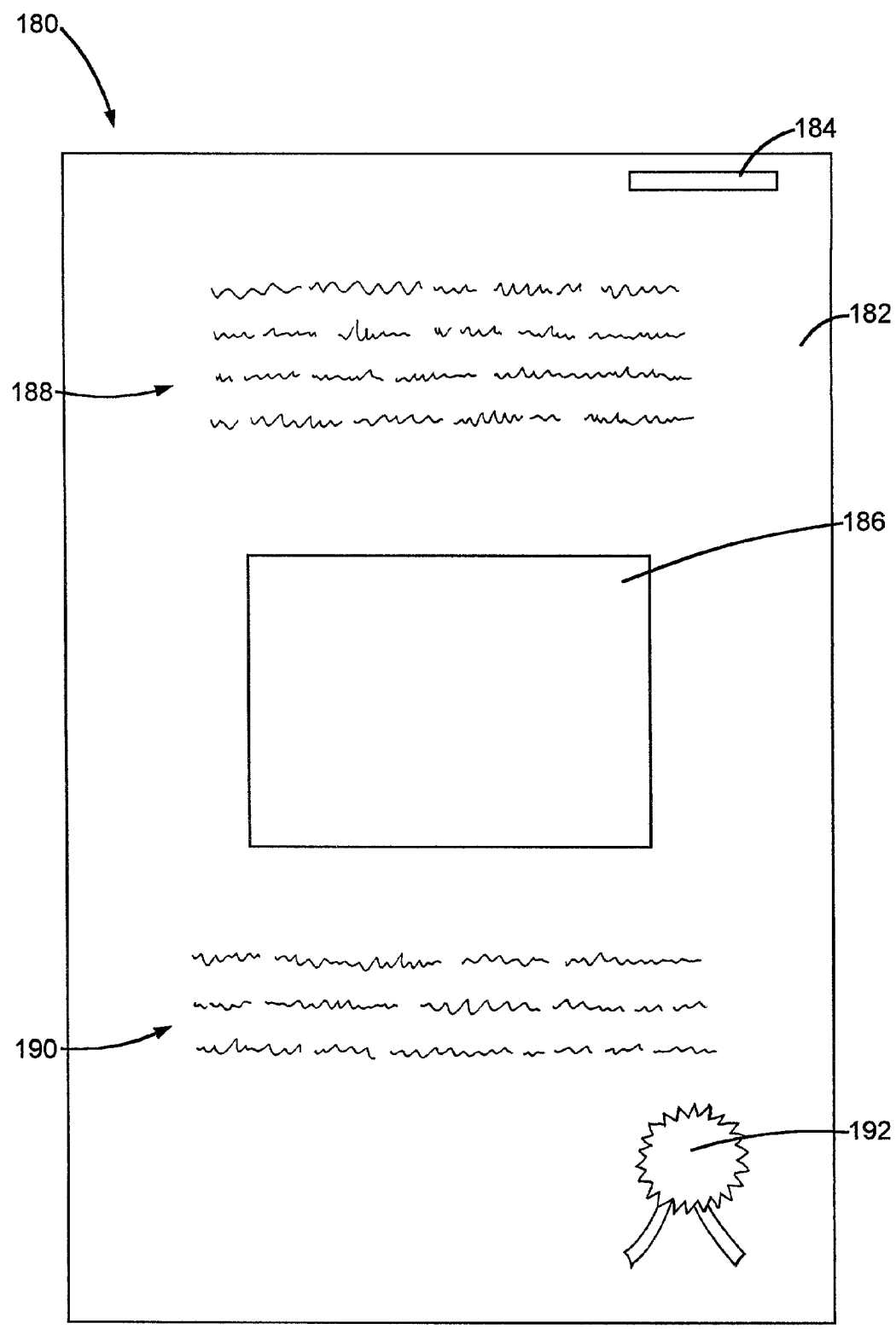
FIG. 7 is a diagrammatic view of a form for use in the present invention.

A diagrammatic view of a form 180 for use in the present invention is shown in FIG. 7. Form 180 may be any type of document in which certain areas are already completed and at least one predetermined area is originally blank, remaining available for printing. The exemplary form 180 of FIG. 7 is an award that includes a backing 182, an identifying mark 184 having encoded data, a predetermined area for printing 186, pre-printed or written areas 188 and 190, and a seal and ribbon 192.

Identifying mark 184 includes encoded data as to the location and size of predetermined area 186. Identifying mark 184 is preferably visually imperceptible, but may be visually perceptible as well. In accordance with the present invention, identifying mark 184 is scanned by optical sensor 94. During such scanning of identifying mark 184, optical sensor 94 produces an electrical signal proportional to the reflected light signal from identifying mark 184. As discussed above, computing device 40 is coupled to optical sensor 94 to receive these electrical signals. Computing device 40 is configured to determine both the size and location of predetermined area 186 of form 180 based on these signals received from optical sensor 94.

Once the size and location or predetermined area 186 are determined, computing device 40 is configured to control printing of images only within predetermined area 186 rather than partially in predetermined area 186 and partially outside of predetermined area 186. If necessary, computing device 40 is configured to size an image by scaling it down so that it fits within predetermined area 186. This helps prevent form waste and user frustration. It also saves time that would otherwise be spent on reprinting another form. Computing device is also configured to size an image by scaling it up so that fits substantially within predetermined area 186 if a user of form 180 so desires.

A diagram of an embodiment of a method 188 of printing forms in a printing device in accordance with the present invention is shown in FIG. 8. Method 188 begins 190 by scanning the identifying mark on the form 192. Next, method 188 determines a location of the predetermined area on the form 194 and determines a size of the predetermined area on the form 196. Next, method 188 prints the image in the predetermined area based on the determined location and size to prevent printing of the image outside of the predetermined area 198. Next, method 188 optionally may size the image to fill the area 200 if the image is smaller than the predetermined area and a user so desires. Method 188 then ends 202.

Although the invention has been described and illustrated in detail, it is to be clearly understood that the same is intended by way of illustration and example only, and is not to be taken necessarily, unless otherwise stated, as an express limitation, nor is it intended to be exhaustive or to limit the invention to the precise form or to the exemplary embodiments disclosed. Modifications and variations may well be apparent to those skilled in the art. Similarly, any method elements described may be interchangeable with other method elements in order to achieve the same result.

For example, in alternative embodiments of the present invention, method 164 may include the additional task for a reused sheet of labels of scanning the marking on the backing to determine which labels remain available for subsequent printing. The spirit and scope of the present invention are to be limited only by the terms of the following claims.

Reference to an element in the singular is not intended to mean "one and only one" unless explicitly so stated, but rather means "one or more." Moreover, no element or component in the present specification is intended to be dedicated to the public regardless of whether the element or component is explicitly recited in the following claims. Finally, no claim element herein is to be construed under the provisions of 35 U.S.C. Section 112, sixth paragraph, unless the element is expressly recited using the phrase "means for . . . "

What is claimed is:

1. A method of printing removable labels in a printing device, each label being attached to a backing and the printing device having an optical sensor, the method comprising:
   inserting into the printing device a sheet of backing having a plurality of locations to which the removable labels are affixed;
   determining a size of each label affixed to the backing;
   determining a location of each label affixed to the backing;
   scanning with the optical sensor to determine any location where one of the labels is not affixed to the backing; and
   printing an image on at least one affixed label based on the determined size of the label to prevent printing of the image on the backing.

2. The method of claim 1, wherein the size of each label affixed to the backing is determined by scanning a characteristic of the backing.

3. The method of claim 1, wherein the location of each label affixed to the backing is determined by scanning a characteristic of the backing.

4. The method of claim 1, further comprising marking the backing after printing to indicate which labels remain available for subsequent printing.

5. The method of claim 4, further comprising scanning the marking on the backing to determine which labels remain available for subsequent printing.

6. The method of claim 1, wherein the backing is an envelope.

7. A system for printing on labels attached to a backing, comprising:
   a printing device for printing images;
   an optical sensor in the printing device, the optical sensor being configured both to read a characteristic of the backing and to scan the labels and backing; and
   a computing device coupled to the printing device to control printing of images by the printing device and to the optical sensor to receive signals therefrom, the computing device being configured to determine a size of the labels on the backing and a location of the labels on the backing based on signals received from the optical sensor during reading of the characteristic of the backing, and the computing device being additionally configured to determine which labels are available for printing based on signals received from the optical sensor during scanning of the labels and backing.

8. The system of claim 7, wherein the computing device is further configured to control printing of images by the printing device on available labels based on the determined sizes and locations of the labels to prevent printing of images on the backing.

9. The system of claim 7, wherein the computing device is further configured to control the printing device to mark the backing with encoded data indicating which labels remain available for subsequent printing.

10. The system of claim 9, wherein the optical sensor is also configured to scan the mark on the backing.

11. A system for printing on removable labels that are attached to a backing, comprising:
    means for determining a size of the labels on the backing;
    means for determining a location of the labels on the backing;
    means for determining whether one the removable labels has been removed from the backing;
    scanning means for determining which labels are available for printing; and
    means for printing an image on at least one available label based on the determined size of the label to prevent printing of the image on the backing.

12. The method of claim 1 including scanning with the optical sensor to determine which affixed labels are available for printing.

13. The method of claim 1 including scanning a characteristic of one of the removable labels and the backing for determining label locations.

* * * * *